US012671641B2

(12) United States Patent
Dutta et al.

(10) Patent No.: US 12,671,641 B2
(45) Date of Patent: Jun. 30, 2026

(54) COMPRESSION OF TELEMETRY DATA

(71) Applicant: Hewlett Packard Enterprise Development LP, Spring, TX (US)

(72) Inventors: Mayukh Dutta, Bangalore (IN); Manoj Srivatsav, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/662,076

(22) Filed: May 13, 2024

(65) Prior Publication Data

US 2025/0254112 A1 Aug. 7, 2025

(30) Foreign Application Priority Data

Feb. 6, 2024 (IN) .............................. 202441008180

(51) Int. Cl.
*H04L 43/04* (2022.01)
*H04L 69/04* (2022.01)

(52) U.S. Cl.
CPC .............. *H04L 43/04* (2013.01); *H04L 69/04* (2013.01)

(58) Field of Classification Search
CPC ...... H04L 43/04; H04L 69/04; H03M 7/3059; H03M 7/30
See application file for complete search history.

(56) References Cited

U.S. PATENT DOCUMENTS 7,249,153 B2 7/2007 Cheng et al.
8,742,959 B1 * 6/2014 Efros .................. H03M 7/3059
341/51

11,516,308 B1 * 11/2022 Dubynskiy ......... G06F 11/3476
2019/0191230 A1 * 6/2019 Li ........................... H03M 7/46
2023/0057444 A1 * 2/2023 Djukic ................... G06N 3/088
(Continued)

FOREIGN PATENT DOCUMENTS

CN 106197424 B 3/2019

OTHER PUBLICATIONS

Hung et al., "An Evaluation of Model-Based Approaches to Sensor Data Compression", IEEE Transactions on Knowledge and Data Engineering, 2012, 14 pages.
(Continued)

*Primary Examiner* — Johnny B Aguiar
(74) *Attorney, Agent, or Firm* — Hewlett Packard Enterprise Patent Department

(57) ABSTRACT

In some examples, a system selects a slice size and a polynomial fitting order from a plurality of candidate slice sizes and a plurality of candidate polynomial fitting orders for representing a series of telemetry data obtained by sensors in a computing environment, where the selecting is based on solving an optimization problem comprising variables representing the slice size, the polynomial fitting order, and a measure of fit. The system divides the series of telemetry data into a plurality of slices having the selected slice size, and applies compression of telemetry data in a slice of the plurality of slices using polynomial fitting according to the selected polynomial fitting order, the applied compression producing compressed telemetry data. The system transmits, over a network, the compressed telemetry data to a processing system for processing of the compressed telemetry data.

20 Claims, 5 Drawing Sheets

(56) References Cited

U.S. PATENT DOCUMENTS

| | | | | |
|---|---|---|---|---|
| 2023/0239224 A1* | 7/2023 | Fauber | .................... | H03M 7/70 |
| | | | | 709/224 |
| 2023/0269145 A1* | 8/2023 | Fauber | .................... | H04L 43/04 |
| | | | | 709/224 |

OTHER PUBLICATIONS

NumPy Developers, "numpy.savez_compressed", available online at <https://numpy.org/doc/stable/reference/generated/numpy.savez_compressed.html>, 2022, 1 page.

Wikipedia, "Chebyshev polynomials", available online at <https://en.wikipedia.org/w/index.php?title=Chebyshev_polynomials&oldid=1169812496>, Aug. 11, 2023, 26 pages.

Wikipedia, "Coefficient of determination", available online at <https://en.wikipedia.org/wiki/Coefficient_of_determination>, Sep. 2019, 15 pages.

Scipy.org, "scipy/scipy/optimize/_minimize.py at v1.11.14," Dec. 1, 2023, scipy/scipy, GitHub<https://web.archive.org/web/20231201225238/https://github.com/scipy/scipy/blob/v1.11.4/scipy/optimize/_minimize.py#L51-L751>, 18 pages.

Chari et al., "Newton-Raphson Method", 2024, 26 pages.

Gao et al., "Fast Piecewise Polynomial Fitting of Time-Series Data for Streaming Computing", vol. 8, 2020, 12 pages.

Oscar Levin, "Polynomial Fitting," Jan. 2, 2024, Discrete Mathematics: An Open Introduction, section 2.3, 5 pages.

Shi Fenglei, "Research on telemetry data compression technology based on inter frame differential adaptive run length encoding," 2021, Journal of Physics: Conference Series, vol. 1827, No. 1, 7 pages.

Wikipedia, "Polynomial regression," Jan. 2, 2024, 5 pages.

Wolfson et al., "Lossless Compression of Telemetry Data—Methodology and Results," 2022, International Telemetering Conference Proceedings, 9 pages.

* cited by examiner

400

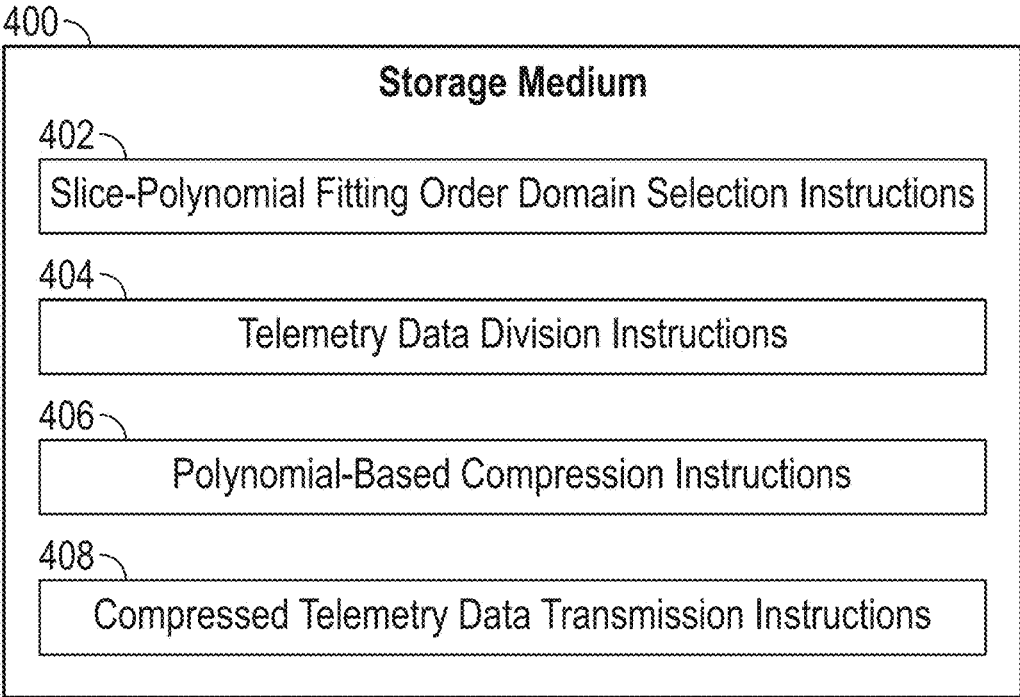

Storage Medium

402

Slice-Polynomial Fitting Order Domain Selection Instructions

404

Telemetry Data Division Instructions

406

Polynomial-Based Compression Instructions

408

Compressed Telemetry Data Transmission Instructions

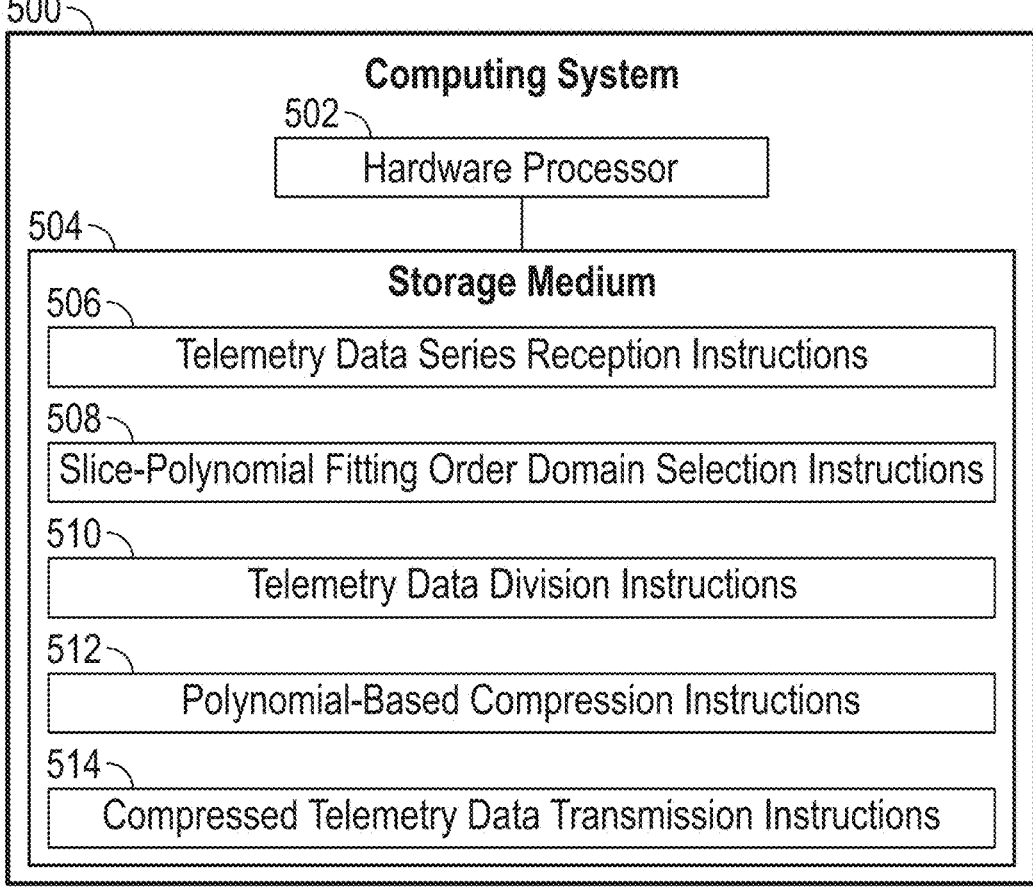

Computing System

502

Hardware Processor

504

Storage Medium

506

Telemetry Data Series Reception Instructions

508

Slice-Polynomial Fitting Order Domain Selection Instructions

510

Telemetry Data Division Instructions

512

Polynomial-Based Compression Instructions

514

Compressed Telemetry Data Transmission Instructions

FIG. 5

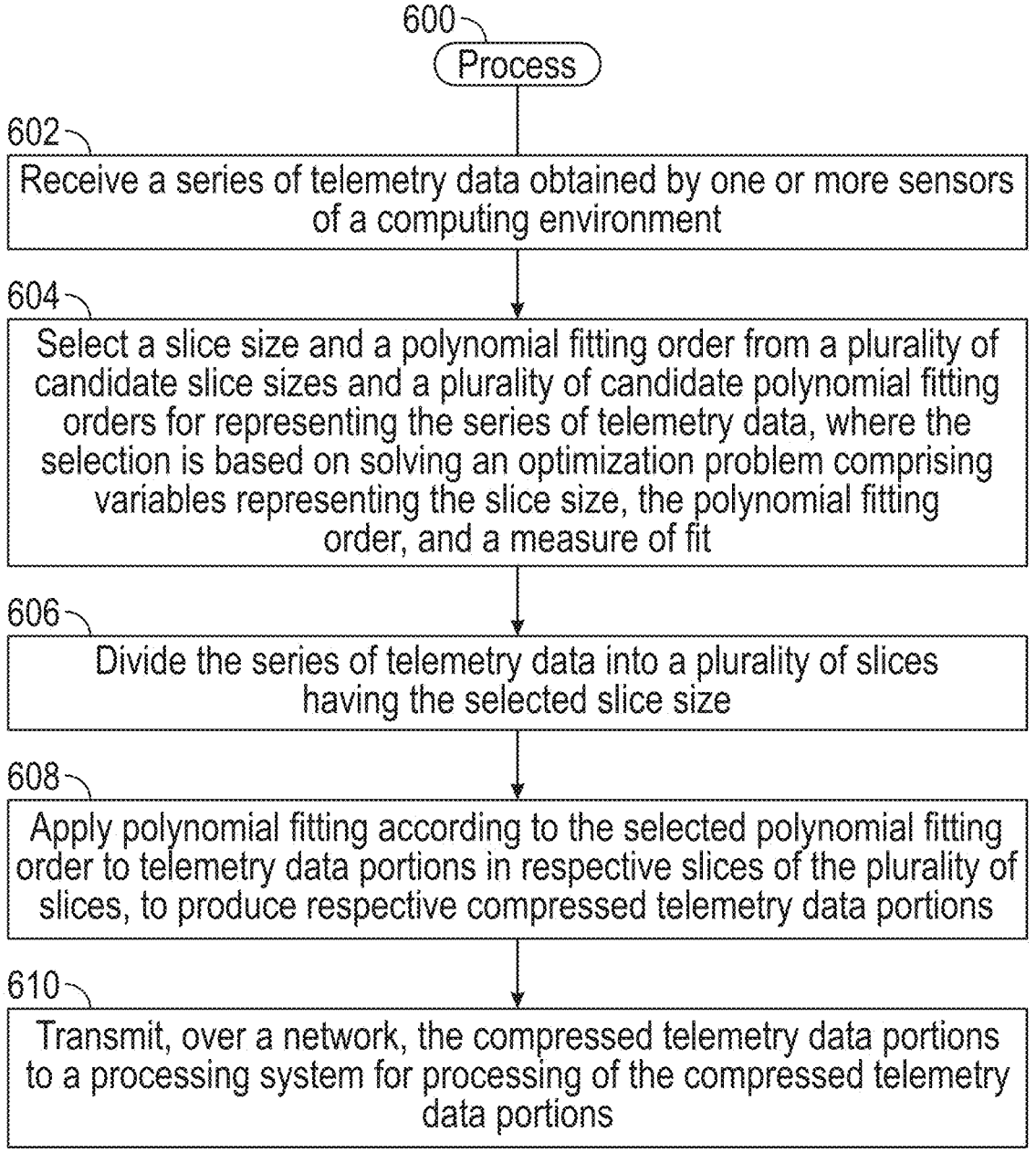

600 — Process

602 — Receive a series of telemetry data obtained by one or more sensors of a computing environment 604 — Select a slice size and a polynomial fitting order from a plurality of candidate slice sizes and a plurality of candidate polynomial fitting orders for representing the series of telemetry data, where the selection is based on solving an optimization problem comprising variables representing the slice size, the polynomial fitting order, and a measure of fit 606 — Divide the series of telemetry data into a plurality of slices having the selected slice size 608 — Apply polynomial fitting according to the selected polynomial fitting order to telemetry data portions in respective slices of the plurality of slices, to produce respective compressed telemetry data portions 610 — Transmit, over a network, the compressed telemetry data portions to a processing system for processing of the compressed telemetry data portions

FIG. 6

COMPRESSION OF TELEMETRY DATA

BACKGROUND

A computing environment can include sensors to collect metrics related to operations in the computing environment and to collect information related to other aspects of the computing environment. The collected information is part of telemetry data that can be sent to a processing system for analysis.

BRIEF DESCRIPTION OF THE DRAWINGS

Some implementations of the present disclosure are described with respect to the following figures.

FIG. 4 is a block diagram of a storage medium storing machine-readable instructions according to some examples.

FIG. 5 is a block diagram of a computing system according to some examples.

FIG. 6 is a flow diagram of a process according to some examples.

Figure 1:
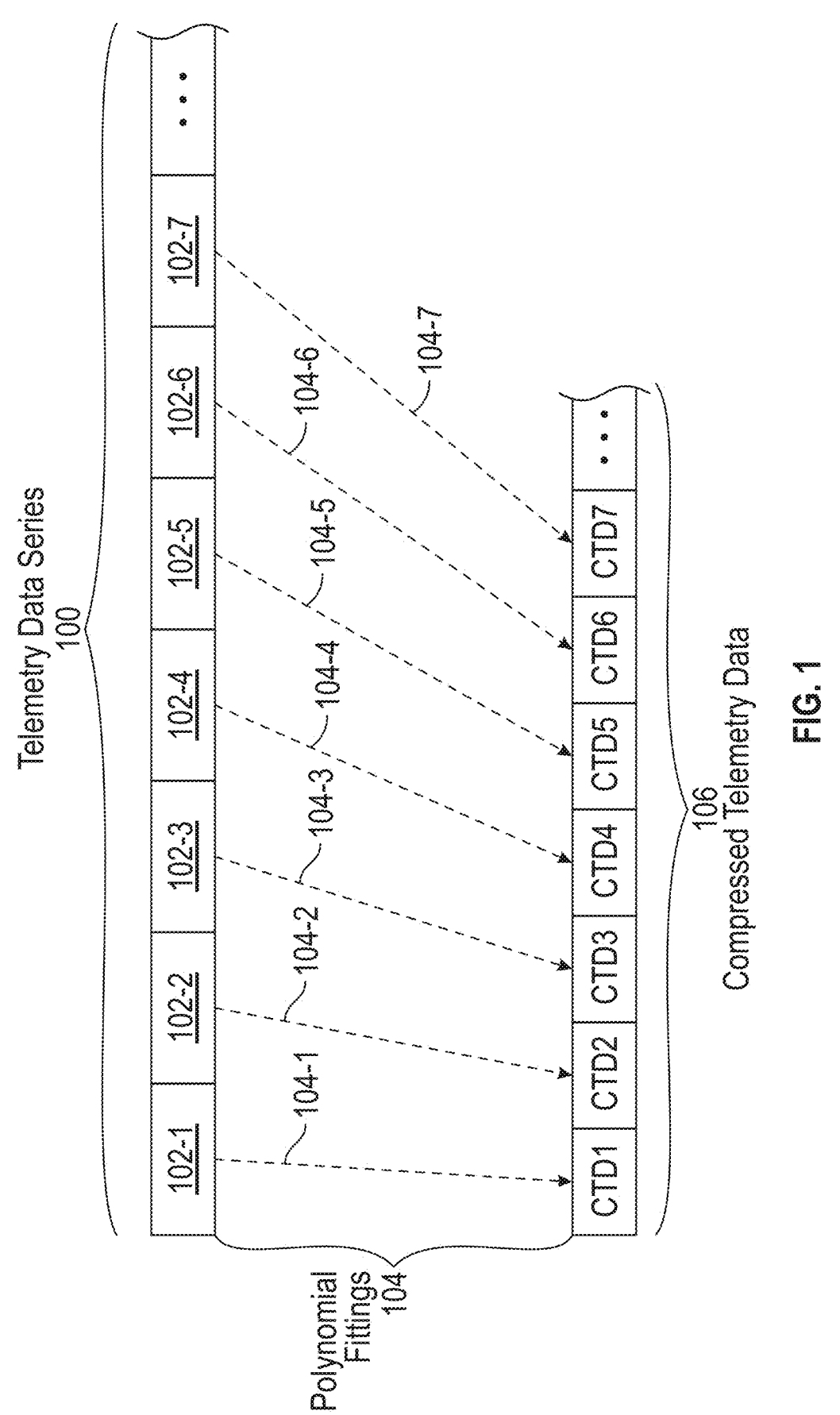
FIG. 1 is a block diagram of a telemetry data series and compressed telemetry data produced by applying polynomial fitting on the telemetry data series, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A processing system can receive telemetry data over a network from a computing environment. The network can include a local area network (LAN), a wide area network (WAN), or another type of network. For example, the processing system may be a cloud-based processing system that is part of a cloud computing environment. In other examples, the processing system may be part of a data center or part of any other computing arrangement. The telemetry data is processed by the processing system for various purposes, such as to perform troubleshooting to identify and resolve issues in the computing environment, to manage the computing environment (e.g., upgrade programs of electronic devices, modify settings of electronic devices, reboot electronic devices, or other tasks that affect operations of electronic devices), and/or for other purposes.

An issue associated with transmitting telemetry data to a processing system is that the amount of the telemetry data may be quite large, especially from a computing environment with a large quantity of sensors. The large amount of telemetry data can overburden a network between the computing environment and the processing system, and can overburden resources of the processing system itself. In some examples, the amount of telemetry data is reduced by down sampling the telemetry data, which refers to increasing the time intervals between telemetry data reporting such that the amount of telemetry data transmitted is reduced. For example, instead of transmitting telemetry data every few seconds, down sampling involves transmitting telemetry data every few minutes or hours (i.e., at larger time intervals). As part of the down sampling of telemetry data, the telemetry data may be averaged (or otherwise aggregated) over the larger time interval. For example, telemetry data collected every few seconds can be aggregated over the larger time interval (e.g., minutes or hours), such that instead of reporting the telemetry data collected at the finer time intervals, the aggregated telemetry data that has been aggregated over the larger time interval is reported. The down sampling and aggregating of telemetry data results in telemetry data of reduced resolution, which may lead to inaccurate analysis by the processing system. For example, issues arising in the computing environment may be transient in nature. The transient issues may be represented by spikes in values of the telemetry data that may not be adequately represented in down sampled and aggregated telemetry data. In other cases, there may be subtle fluctuations in the performance of computing entities (in the computing environment) caused by complex interactions among the computing entities. Such subtle fluctuations may also not be adequately represented in down sampled and aggregated telemetry data.

In accordance with some implementations of the present disclosure, compression can be applied on telemetry data by using polynomial fitting in respective slices of a series of telemetry data. A series of telemetry data (also referred to as a "telemetry data series") can include a time series of telemetry data at successive time points. In other examples, a telemetry data series can include a series of telemetry data at different spatial points or at any other points (e.g., points representing computing entities, users, organizations, etc.).

FIG. 1 illustrates the application of polynomial fittings 104 on a telemetry data series 100. "Telemetry data" can refer to any data collected in a computing environment that relates to an operation or other aspect of the computing environment. Examples of telemetry data can include performance metrics representing performance of resources (e.g., processing resources, communication resources, storage resources, programs, etc.), a load of the resources, metrics representing environmental conditions (e.g., temperature, pressure, humidity, etc.), information representing events (data encryption events, data read or write events, login events, etc.), logs, and/or other types of telemetry data.

Telemetry data can be collected by sensors. A "sensor" can refer to a hardware sensor or a monitoring agent implemented using machine-readable instructions. A sensor can be part of an electronic device or can be outside an electronic device.

A "polynomial fitting" applied on data refers to representing the data using a polynomial. A polynomial is a mathematical expression including variables (indeterminates) and coefficients. An example of a polynomial with a variable (indeterminate) y is $c_0+c_1y+c_2y^2+ \ldots +c_my^m$, where $c_0, c_1, c_2, \ldots, c_m(m{\geq}1)$ are coefficients. The polynomial has a "polynomial fitting order," which refers to a number of coefficients of the polynomial that is used to fit a given data collection.

In some examples, a polynomial used to represent a slice of a telemetry data series includes a Chebyshev polynomial. In further examples, a Chebyshev polynomial can use a minimax approximation to ensure a tight bound on the maximum errors across a given interval, such as a time interval of a slice of a telemetry data series. A minimax approximation refers to a technique to approximate a mathematical function that minimizes a maximum error.

Although reference is made to a Chebyshev polynomial for representing slices of a telemetry data series, in other examples, other types of polynomials can be used to represent telemetry data within slices of a telemetry data series.

As shown in FIG. 1, the telemetry data series 100 is divided into multiple slices 102-1, 102-2, 102-3, 102-4, 102-5, 102-6, 102-7, and so forth, where each slice 102-$j$ ($j$=1 to M, M≥2) includes a respective subset ("telemetry data slice portion") of the telemetry data in the telemetry data series 100. Techniques or mechanisms according to some examples of the present disclosure can select a slice size of each slice (from a plurality of candidate slice sizes) and a polynomial fitting order (from a plurality of candidate polynomial fitting orders) for representing the telemetry data series 100. Each slice 102-$j$ of the time series data 100 has the selected slice size. The selection of the slice size and the polynomial fitting order is based on solving an optimization problem including variables representing the slice size, the polynomial fitting order, and a measure of fit. Compression is applied on telemetry data slice portions in respective slices using corresponding polynomial fittings 104 according to the selected polynomial fitting order to produce compressed telemetry data 106.

A "slice" of a series of telemetry data refers to a segment of the series of telemetry data, where the segment is less than an entirety of the series of telemetry data. A "slice size" refers to a length of the slice, such as a time length (e.g., how many seconds, minutes, or other time units), a spatial extent (e.g., how many centimeters, meters, or other spatial units), or any other dimensional aspect of the slice.

In the example of FIG. 1, a polynomial fitting 104-1 of the selected polynomial fitting order is applied on the telemetry data slice portion of the slice 102-1 to produce compressed telemetry data portion CTD1, a polynomial fitting 104-2 of the selected polynomial fitting order is applied on the telemetry data slice portion of the slice 102-2 to produce compressed telemetry data portion CTD2, a polynomial fitting 104-3 of the selected polynomial fitting order is applied on the telemetry data slice portion of the slice 102-3 to produce compressed telemetry data portion CTD3, a polynomial fitting 104-4 of the selected polynomial fitting order is applied on the telemetry data slice portion of the slice 102-4 to produce compressed telemetry data portion CTD4, a polynomial fitting 104-5 of the selected polynomial fitting order is applied on the telemetry data slice portion of the slice 102-5 to produce compressed telemetry data portion CTD5, a polynomial fitting 104-6 of the selected polynomial fitting order is applied on the telemetry data slice portion of the slice 102-6 to produce compressed telemetry data portion CTD6, a polynomial fitting 104-7 of the selected polynomial fitting order is applied on the telemetry data slice portion of the slice 102-7 to produce compressed telemetry data portion CTD7, and so forth. The compressed telemetry data portions CTD1 to CTD7 are part of the compressed telemetry data 106. Note that the polynomial fitting order selected for one slice may be the same as or different from polynomial fitting order(s) selected for other slice(s) of the telemetry data series 100.

The compressed telemetry data 106 produced by the applied compression is transmitted over a network to a processing system for processing of the compressed telemetry data. The compressed telemetry data includes coefficients of the polynomial fittings 104 in respective slices of the telemetry data series 100. Note that each compressed telemetry data portion CTDj ($j$=1 to M) includes the coefficients of the polynomial fitting 104-$j$ applied on the slice 102-$j$, and not the underlying telemetry data slice portion. Thus, what is transmitted over the network to the processing system are the polynomial fitting coefficients for each slice, and not the telemetry data slice portion. As a result, an improvement in the technology of telemetry data communications is achieved by reducing the amount of telemetry data transmitted over a network, which reduces consumption of network resources and reduces the likelihood of overburdening the network. Also, an improvement in computer functionality is achieved since issues associated with a computing environment can be more timely ascertained based on telemetry data by a processing system, to address any problems that may lead to faults or reduced performance of the computing environment.

The compressed telemetry data portion CTD1 includes a first collection of polynomial coefficients of the polynomial fitting 104-1 applied on the telemetry data slice portion of the slice 102-1, the compressed telemetry data portion CTD2 includes a second collection of polynomial coefficients of the polynomial fitting 104-2 applied on the telemetry data slice portion of the slice 102-2, and so forth. The quantity of polynomial fitting coefficients in each telemetry data portion CTDj depends on the polynomial fitting order selected for the slice 102-$j$. Note that a quantity of polynomial coefficients in one collection polynomial coefficients may be the same as or different from a quantity of polynomial coefficients in another collection polynomial coefficients.

At the processing system, telemetry data can be reconstructed based on the polynomial fitting coefficients in the compressed telemetry data 106. More specifically, at the processing system, the telemetry data slice portion for the slice 102-1 is reconstructed from the polynomial fitting coefficients of the compressed telemetry data portion CTD1, the telemetry data slice portion for the slice 102-2 is reconstructed from the polynomial fitting coefficients of the compressed telemetry data portion CTD2, the telemetry data slice portion for the slice 102-3 is reconstructed from the polynomial fitting coefficients of the compressed telemetry data portion CTD3, the telemetry data slice portion for the slice 102-4 is reconstructed from the polynomial fitting coefficients of the compressed telemetry data portion CTD4, the telemetry data slice portion for the slice 102-5 is reconstructed from the polynomial fitting coefficients of the compressed telemetry data portion CTD5, the telemetry data slice portion for the slice 102-6 is reconstructed from the polynomial fitting coefficients of the compressed telemetry data portion CTD6, the telemetry data slice portion for the slice 102-7 is reconstructed from the polynomial fitting coefficients of the compressed telemetry data portion CTD7, and so forth.

The compression of telemetry data provided by polynomial fitting can be lossy compression, in which some of the original telemetry data may be lost and may not be recovered by a recipient. In the examples discussed above, the compression of a telemetry data slice portion that generates polynomial fitting coefficients to represent the telemetry data slice portion is an example of a lossy compression. At the processing system, the reconstructed telemetry data slice portion is an approximation of the original telemetry data slice portion.

Lossy compression applied on telemetry data may be acceptable in scenarios where the telemetry data is to be analyzed for purposes such as issue identification (e.g., to identify problems or other issues in a computing environment), performance determination (e.g., to determine a performance level of the computing environment), or other purposes in which an approximation of the telemetry data is acceptable.

In examples where a polynomial used to apply the polynomial fittings is a Chebyshev polynomial, the Chebyshev polynomial for representing a telemetry data slice portion s(y) may be expressed as:

$$s(y) \approx \left[ \sum_{i=0}^{m} c_i T_i(y) \right] - \frac{c_0}{2}, \qquad \text{(Eq. 1)}$$

where $c_0, \ldots c_m$ are the coefficients of the Chebyshev polynomial, the polynomial fitting order is m+1 (m≥1), and $T_i(y) = \cos(i \cdot \arccos y)$.

In other examples, other types of polynomials can be used to represent telemetry data slice portions.

Figure 2:
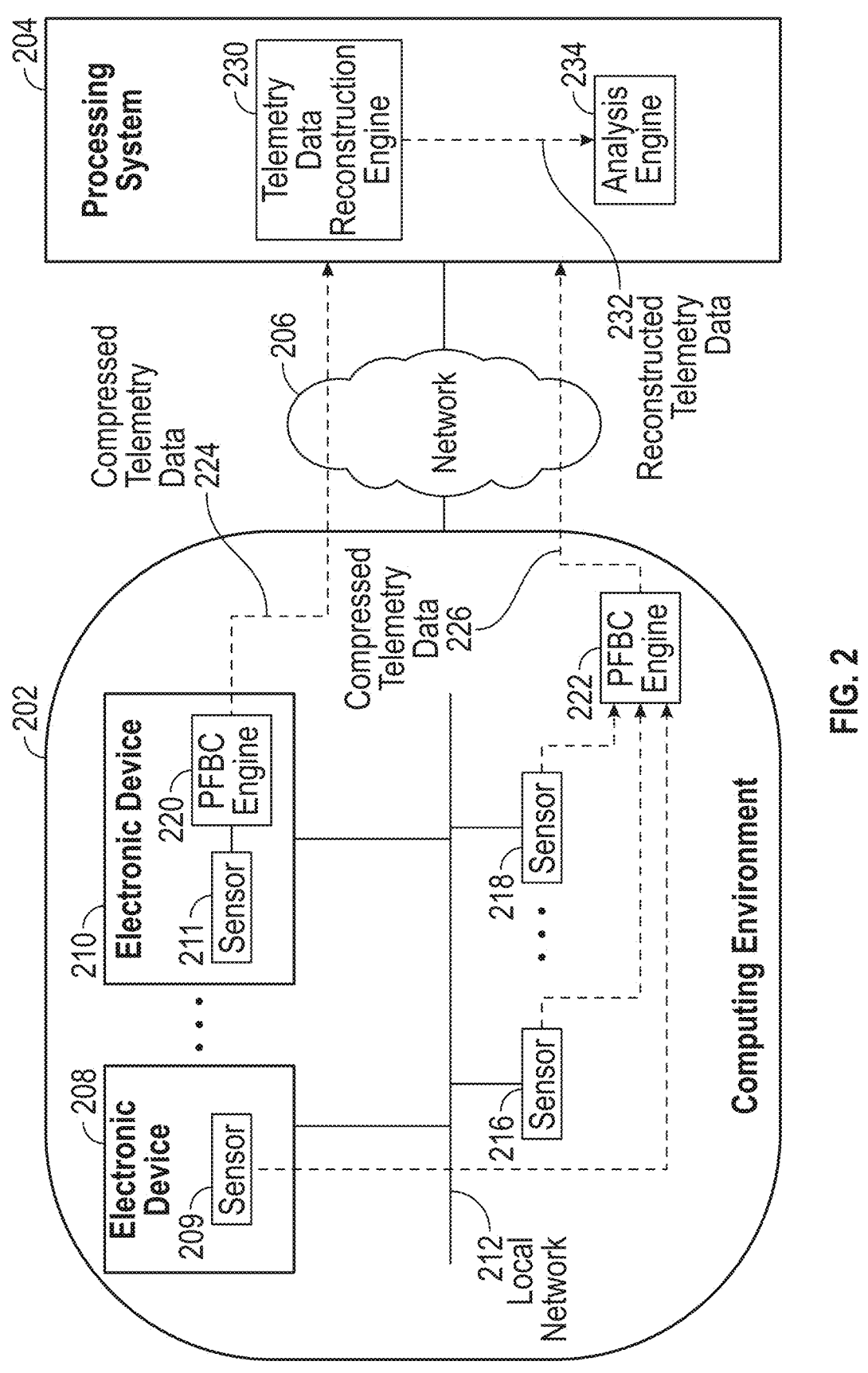
FIG. 2 is a block diagram of an arrangement that includes a computing environment with polynomial fitting-based compression engines, where the computing environment is coupled to a remote processing system that has a telemetry data reconstruction engine, according to some examples.

FIG. 2 is a block diagram of an example arrangement that includes a computing environment 202 and a processing system 204 that is coupled over a network 206 to the computing environment 202. The network 206 can be a WAN, such as the Internet, or another type of network. The network 206 can include a wired network and/or a wireless network.

A "computing environment" can refer to any environment that includes computing resources, such as electronic devices 208, 210, programs, and other computing resources. A computing environment can refer to an environment associated with an organization (e.g., a business concern, a government agency, or an educational organization), a home, a cloud computing environment, or any other type of computing environment.

The electronic devices 208 and 210 are connected to a local network 212, such as a LAN or another type of network. The local network 212 can be a wired network and/or a wireless network. In some examples, the electronic device 208 includes a sensor 209, and the electronic device 210 includes a sensor 211. In further examples, a different quantity of electronic devices may be included in the computing environment 202. Also, some electronic devices may include more than one sensor.

The computing environment 202 also includes sensors 216 and 218 that are external of electronic devices. The sensors 216 and 218 are also connected to the local network 212. In further examples, a different quantity of sensors that are external of electronic devices may be present in the computing environment 202.

The sensor 209 is used to collect information associated with the electronic device 208, and the sensor 211 is used to collect information associated with the electronic device 210. The sensor 216 or 218 is able to collect information associated with one or more electronic devices and/or other resources of the computing environment 202.

The information collected by the sensors 209, 211, 216, and 218 are referred to as "telemetry data." The telemetry data from a sensor can be sent to the processing system 204 over the network 206 for processing by the processing system 204. The processing system 204 is implemented using one or more computers. In some examples, the processing system 204 is a cloud-based processing system that is in a cloud environment. In other examples, the processing system 204 may be part of a data center or another computing environment.

If there is a large quantity of sensors in the computing environment, the total amount of telemetry data that is to be sent over the network 206 for processing by the processing system 204 can be large. The large amount of telemetry data if transmitted over the network 206 can overburden the communication resources of the network 206 and/or can overburden processing and other resources of the processing system 204.

In accordance with some implementations of the present disclosure, polynomial fitting-based compression (e.g., as illustrated in FIG. 1) can be applied to a telemetry data series (e.g., 100 in FIG. 1) such that compressed telemetry data is transmitted to the processing system 204 rather than the original telemetry data series. In examples according to FIG. 2, the electronic device 210 includes a polynomial fitting-based compression (PFBC) engine 220, which is used to compress telemetry data produced by the sensor 211. Although just one sensor 211 is shown in the electronic device 210, note that the electronic device 210 may include multiple sensors. The PFBC engine 220 can be used to compress data from one or more sensors in the electronic device 210. The one or more sensors in the electronic device 210 produce a telemetry data series that is divided into slices (e.g., as shown in FIG. 1), and polynomial fittings can be applied on telemetry data slice portions in the respective slices to produce compressed telemetry data 224.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

FIG. 2 also shows a PFBC engine 222 that can be used to compress telemetry data from one or more sensors, such as the sensors 209, 216, and 218. The sensors 209, 216, and 218 output a telemetry data series (or multiple telemetry data series) that is (are) divided into slices (e.g., as shown in FIG. 1), and polynomial fittings can be applied on telemetry data slice portions in the respective slices to produce compressed telemetry data 226.

Although two PFBC engines are shown in FIG. 2, in other examples, a different quantity (less than two or more than two) PFBC engines can be employed to compress data from respective collections of sensors. A "collection" of sensors can refer to a single sensor or multiple sensors.

The compressed telemetry data 224 and 226 from the PFBC engines 220 and 222 are transmitted over the network 206 to the processing system 204. Each compressed telemetry data 224 or 226 includes compressed telemetry data portions (e.g., CTD1 to CTD7 depicted in FIG. 1) that represent the telemetry data slice portions of respective slices of the corresponding telemetry data series. A compressed telemetry data portion includes polynomial coefficients of the polynomial used to fit the telemetry data slice portions of the corresponding slice. Different slices of the telemetry data series can be compressed using polynomial fittings of different orders, which results in different quantities of polynomial coefficients used to represent the different slices.

The processing system 204 includes a telemetry data reconstruction engine 230. The telemetry data reconstruction engine 230 receives the compressed telemetry data 224 and the compressed telemetry data 226 from the computing environment 202. The telemetry data reconstruction engine 230 reconstructs telemetry data slice portions for respective slices represented by corresponding collections of polynomial coefficients. Reconstructed telemetry data is represented as 232 in FIG. 2. As noted above, since a polynomial fitting is an approximate representation of the telemetry data slice portion in a slice, the reconstructed telemetry data for the slice produced by the telemetry data reconstruction engine 230 constitutes approximate telemetry data.

The reconstructed telemetry data 232 is provided by the telemetry data reconstruction engine 230 to an analysis engine 234, which can be part of the processing system 204 or can be separate from the processing system 204. The analysis engine 234 can apply a target analysis on the reconstructed telemetry data 232, which can include analyzing the reconstructed telemetry data 232 to identify issues in the computing environment 202, identify root causes of issues in the computing environment 202, determine remediation actions for identified issues, produce information that represents operational or other characteristics of the computing environment 202, or other analysis.

To further reduce the amount of telemetry data sent over the network 206, bit quantization can be applied to represent the collections of polynomial coefficients representing respective slices of telemetry data. Bit quantization refers to using a specific quantity of data bits to represent values (in this case the coefficients of a polynomial used to fit a telemetry data slice portion), where the quantity of bits used is less than what would be used to fully represent the entire range of possible values of the coefficients. For example, a bit quantization can refer to a floating point quantization in which a floating point value (of a polynomial coefficient) is represented as an integer using a specific quantity of data bits. Other types of bit quantization may be employed in other examples. Bit quantization applied on compressed telemetry data (including polynomial coefficients) produces quantized telemetry data.

A PFBC engine (e.g., 220 or 222 in FIG. 2) selects a slice size and a polynomial fitting order for a slice of a telemetry data series is based on solving an optimization problem including variables representing the slice size, the polynomial fitting order, and a measure of fit. The optimization problem is represented graphically by FIG. 3.

Figure 3:
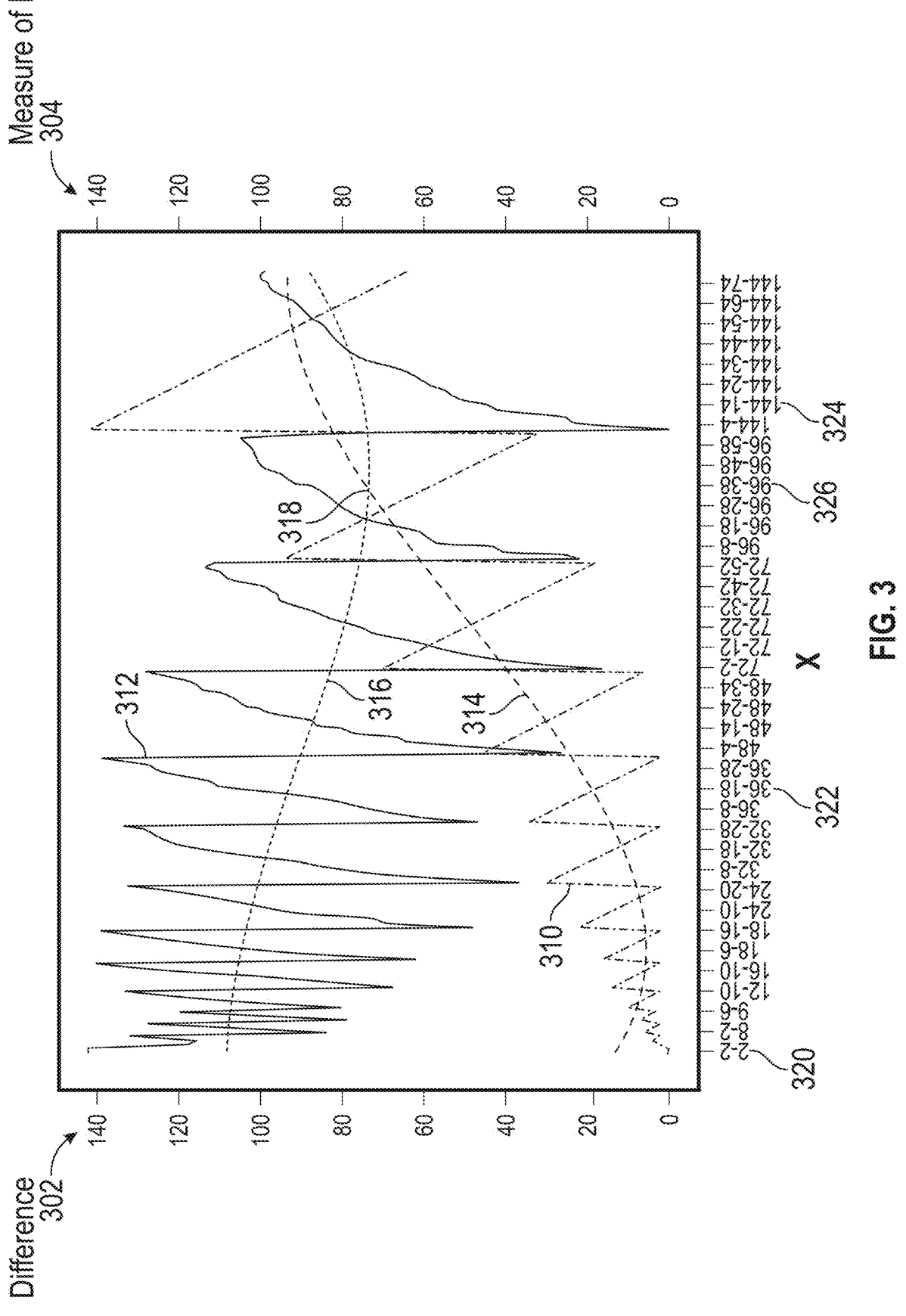
FIG. 3 is a graph including curves representing a measure of fit and properties associated with polynomial fitting, according to some examples.

FIG. 3 is a graph that has a horizontal axis (X axis) representing combinations of slice sizes and polynomial fitting orders, and a vertical axis that represents values of a difference parameter 302 that is based on the difference between a slice size and the polynomial fitting order, and values of a measure of fit 304.

Each point on the X axis represents a combination of a slice size and a polynomial fitting order. For example, a combination 2-2 (represented as 320) on the X axis indicates a slice size of 2 units (e.g., 2 seconds, 2 minutes, 2 hours, etc.) and a polynomial fitting order of 2 (e.g., a polynomial having 2 polynomial coefficients to fit a telemetry data slice portion in a slice of a telemetry data series). Another combination 36–18 (represented as 322) indicates a slice size of 36 units and a polynomial fitting order of 18 (e.g., a polynomial having 18 polynomial coefficients). A further combination 144–14 (represented as 324) on the X axis represents a slice size of 144 units and a polynomial fitting order of 14.

In some examples, the difference parameter 302 has a value that is based on a slice size minus a polynomial fitting order. Thus, the value of the difference parameter 302 for the combination 2–2 is 0, the value of the difference parameter 302 for the combination 36–18 is 18, the value of the difference parameter 302 for the combination 144–14 is 130, and so forth. The difference parameter 302 is a numeric quantity that represents a slice-polynomial fitting order dimension. In other examples, a different parameter can be used to represent the slice-polynomial fitting order dimension, such as a parameter based on a product of the slice and the polynomial fitting order, a parameter that is a quotient after division of the slice and the polynomial fitting order, or any other aggregate of the slice size and polynomial fitting order.

A "measure of fit" can refer to a value that indicates how well a polynomial fits data that is sought to be represented by the polynomial. In some examples, the measure of fit includes an $R^2$ score (also referred to as an R-squared score), which is a statistical measure that represents the proportion of the variance for a dependent variable that is explained by an independent variable. In other examples, other measures of fit can be employed such as a root mean squared error, a mean squared error, a mean absolute error, a coefficient of determination, and so forth.

Intuitively, whether a polynomial of a given polynomial fitting order can adequately fit a telemetry data slice portion in a slice depends on the quantity of data values in the telemetry data slice portion. For example, a slice having a slice size 144 can have a larger quantity of telemetry data values (e.g., 144 telemetry data values) than a slice having a smaller slice size (e.g., 2). Generally, a polynomial fitting order that is too small may not adequately represent a slice of a larger slice size (e.g., a polynomial of order 2 may not adequately represent the 144 telemetry data values of a slice of slice size 144). The optimization problem is to identify which combination of a slice size and a polynomial fitting order is optimal for representing a telemetry data series.

A curve 310 represents the difference parameter 302 values for respective combinations of slice size and polynomial fitting order, as represented by different points along the X axis. A curve 312 represents values of the measure of fit 304 for the respective combinations of slice size and polynomial fitting order represented by the X axis. The different combinations of slice size and polynomial fitting order on the X axis can be represented using numeric values, such as 1, 2, . . . N, where N is the quantity of different combinations of slice sizes and polynomial fitting orders. Combination 1 can represent the 2-2 combination, combination 2 can represent the 8-2 combination, and so forth.

A polynomial P(X) can be used to represent the curve 310, such as according to Eq. 2 below:

$$P(X) = \alpha_0 + \alpha_1 X + \alpha_2 X^2 + \ldots + \alpha_n X^n, X \epsilon (1 \ldots N). \quad \text{(Eq. 2)}$$

$X \epsilon (1 \ldots N)$ represents a point along the X axis of the graph of FIG. 3, for example.

Similarly, a polynomial Q(X) can be used to represent the curve 312, such as according to Eq. 3 below:

$$Q(X) = b_0 + b_1 X + b_2 X^2 + \ldots + b_n X^n, X \epsilon (1 \ldots N). \quad \text{(Eq. 3)}$$

The polynomials P(X) and Q(X) are different from the polynomials (e.g., according to Eq. 1) used to fit telemetry data slice portions of respective slices discussed above.

In each of Eq. 2 and Eq. 3, n polynomial coefficients, where $n \geq 1$, are used. The value of n can be selected by a human, machine, or program, depending on which polynomial fitting order of the polynomials P(X) and Q(X) would best fit the values of the difference parameter 302 and values of the measure of fit 304.

In other examples, the number of polynomial coefficients for P(X) can be different from the number of polynomial coefficients for Q(X). Note that the polynomial P(X) represents the difference parameter 302 values for different slice-polynomial fitting order combinations, and Q(X) represent the measure of fit 304 values for different slice-polynomial fitting order combinations.

The polynomial P(X) is represented by curve 314, and the polynomial Q(X) is represented by curve 316 in FIG. 3. The optimization problem is to find an intersection 318 of the curves 314 and 316 (as represented by P(X) and Q(X), respectively), which identifies a combination of a slice size and a polynomial fitting order that is to be used to apply lossy compression on telemetry data. In the example of FIG. 3, the intersection 318 occurs at point 326 on the X axis, which represents the combination 96–38 (slice size of 96 and polynomial fitting order of 38). Using this solution, the slice size selected for dividing a telemetry data series into slices is 96, and the polynomial fitting order 38 is selected for each slice of slice size 96.

To find the intersection between polynomials P(X) and Q(X), a PFBC engine (220 or 222) solves the optimization problem represented by the following expression:

$$h(X) = P(X) - Q(X) = 0. \qquad \text{(Eq. 4)}$$

Eq. 4 seeks to determine a value of X where h(X)=0, in other words, P(X)–Q(X)=0 (which represents an intersection of P(X) and Q(X)). The determined value of X that satisfies h(X)=0 occurs at a point of intersection between P(X) and Q(X). The determined value of X represents a combination of a slice size and polynomial fitting order, such as the value of X representing 96-38 at which curves 314 and 316 intersect in FIG. 3. Finding a value of X to solve Eq. 4 can use the Newton Raphson technique, for example. In other examples, other techniques for finding X such that h(X)=0 can be employed.

Note that the solving of the optimization problem represented by Eq. 4 is performed on a slice-by-slice basis. For example, given the slices 102-1, 102-2, 102-3, and so forth, of FIG. 1, a PFBC engine solves the optimization problem for the slice 102-1, solves the optimization problem for the slice 102-2, solves the optimization problem for the slice 102-3, and so forth. A constraint applied to solving the optimization problem independently for the different slices is that the slice size is the same across the slices (e.g., the slice 102-1 has slice size s, the slice 102-2 has the same slice size s, the slice 102-3 has the same slice size s, and so forth). However, the optimization problem solved independently for the multiple slices may produce different polynomial fitting orders across different slices, although it is possible that the solving of the optimization problem for the multiple slices may produce the same polynomial fitting order for at least two of the slices.

FIG. 4 is a block diagram of a non-transitory machine-readable or computer-readable storage medium 400 storing machine-readable instructions that upon execution cause a computing system to perform various tasks. The computing system may include one or more computers, which may include a PFBC engine (e.g., 220 or 222).

The machine-readable instructions include slice-polynomial fitting order domain selection instructions 402 to select a slice size and a polynomial fitting order from a plurality of candidate slice sizes and a plurality of candidate polynomial fitting orders for representing a series of telemetry data obtained by sensors in a computing environment. The selection of the slice-polynomial fitting order domain (which includes the selected slice size and the selected polynomial fitting order) is based on solving an optimization problem including variables representing the slice size, the polynomial fitting order, and a measure of fit.

The machine-readable instructions include telemetry data division instructions 404 to divide the series of telemetry data into a plurality of slices having the selected slice size. Each slice of the plurality of slices may have the same selected slice size.

The machine-readable instructions include polynomial-based compression instructions 406 to apply a compression of telemetry data in a slice of the plurality of slices using polynomial fitting according to the selected polynomial fitting order. The applied compression produces compressed telemetry data, which includes polynomial coefficients but not the original telemetry data of the series of telemetry data. In some examples, the polynomial fitting applied to telemetry data in each slice includes a Chebyshev polynomial fitting that uses a Chebyshev polynomial to fit the telemetry data in the slice.

The machine-readable instructions include compressed telemetry data transmission instructions 408 to cause transmission, from the computing system over a network, the compressed telemetry data to a processing system for processing of the compressed telemetry data. Causing transmission of the compressed telemetry data can refer to a hardware processor triggering a communication interface of the computing system to transmit the compressed telemetry data. The processing system can reconstruct approximate telemetry data using the polynomial coefficients of the compressed telemetry data.

In some examples, a first variable represents the slice size and the polynomial fitting order, and a second variable represents the measure of fit. More specifically, the first variable may represent an aggregate (e.g., a difference or another aggregate) of the slice size and the polynomial fitting order.

In some examples, the machine-readable instructions represent values of the first variable using a first polynomial, and represent values of the second variable using a second polynomial. The solving of the optimization problem may involve finding an intersection of the first polynomial and the second polynomial.

In some examples, the polynomial fitting according to the selected polynomial fitting order is applied to first telemetry data in a first slice of the plurality of slices to produce a first compressed telemetry data portion, and the polynomial fitting according to the selected polynomial fitting order is applied to second telemetry data in a second polynomial fitting order to produce a second compressed telemetry data portion.

In some examples, the first compressed telemetry data portion includes a first collection of polynomial coefficients produced by applying the polynomial fitting to the first telemetry data, and the second compressed telemetry data portion comprises a second collection of polynomial coefficients produced by applying the polynomial fitting to the second telemetry data.

In some examples, a quantity of the coefficients in each of the first collection of polynomial coefficients and the second collection of polynomial coefficients is based on the selected polynomial fitting order.

In some examples, a first polynomial fitting order selected for the first slice of the plurality of slices is different from a second polynomial fitting order selected for the second slice, and a quantity of polynomial coefficients in the first collection of polynomial coefficients is different from a quantity of polynomial coefficients in the second collection of polynomial coefficients.

In some examples, the machine-readable instructions select the first polynomial fitting order for the first slice by solving the optimization problem for the first slice, and select the second polynomial fitting order for the second slice by solving the optimization problem for the second slice independently from solving the optimization for the first slice.

In some examples, the machine-readable instructions reconstruct the first telemetry data at the processing system using the first collection of polynomial coefficients to produce reconstructed first telemetry data, and reconstruct the second telemetry data at the processing system using the second collection of polynomial coefficients to produce reconstructed second telemetry data.

In some examples, the machine-readable instructions perform troubleshooting or management of the computing environment using reconstructed telemetry data including the reconstructed first telemetry data and the reconstructed second telemetry data.

In some examples, the compressed telemetry data includes polynomial coefficients produced by applying the polynomial fitting to the series of telemetry data, and the machine-readable instructions apply bit quantization on the polynomial coefficients to produce quantized polynomial coefficients, where the compressed telemetry data includes the quantized polynomial coefficients.

FIG. 5 is a block diagram of a computing system 500 including a hardware processor 502 (or multiple hardware processors). A hardware processor can include a microprocessor, a core of a multi-core microprocessor, a microcontroller, a programmable integrated circuit, a programmable gate array, or another hardware processing circuit.

The computing system 500 includes a storage medium 504 storing machine-readable instructions executable on the hardware processor 502 to perform various tasks. Machine-readable instructions executable on a hardware processor can refer to the instructions executable on a single hardware processor or the instructions executable on multiple hardware processors.

The machine-readable instructions in the storage medium 504 include telemetry data series reception instructions 506 to receive a series of telemetry data of a computing environment. For example, the series of telemetry data may be from one or more sensors of the computing environment.

The machine-readable instructions in the storage medium 504 include slice-polynomial fitting order domain selection instructions 508 to select a slice size and a polynomial fitting order from a plurality of candidate slice sizes and a plurality of candidate polynomial fitting orders for representing the series of telemetry data. The selection of the slice-polynomial fitting order domain is based on solving an optimization problem including variables representing the slice size, the polynomial fitting order, and a measure of fit.

The machine-readable instructions in the storage medium 504 include telemetry data division instructions 510 to divide the series of telemetry data into a plurality of slices having the selected slice size.

The machine-readable instructions in the storage medium 504 include polynomial-based compression instructions 512 to apply polynomial fitting to telemetry data portions in respective slices of the plurality of slices, to produce respective compressed telemetry data portions. The application of the polynomial fitting includes applying a polynomial fitting to a slice of the plurality of slices using the selected polynomial fitting order. A polynomial fitting order for a first slice may be the same as or different from a polynomial fitting order for a second slice. In some examples, a first compressed telemetry data portion of the compressed telemetry data portions includes a first collection of polynomial coefficients, and a second compressed telemetry data portion of the compressed telemetry data portions includes a second collection of polynomial coefficients.

The machine-readable instructions in the storage medium 504 include compressed telemetry data transmission instructions 514 to cause transmission, from the computing system over a network, the compressed telemetry data portions to a processing system for processing of the compressed telemetry data portions.

FIG. 6 is a flow diagram of a process 600 according to some examples. The process 600 can be performed by one or more computers. The process 600 includes receiving (at 602), at a computing system, a series of telemetry data obtained by one or more sensors of a computing environment.

The process 600 includes selecting (at 604), by the computing system, a slice size and a polynomial fitting order from a plurality of candidate slice sizes and a plurality of candidate polynomial fitting orders for representing the series of telemetry data. The selection is based on solving an optimization problem comprising variables representing the slice size, the polynomial fitting order, and a measure of fit.

The process 600 includes dividing (at 606), by the computing system, the series of telemetry data into a plurality of slices having the selected slice size. The process 600 includes applying (at 608), by the computing system, polynomial fitting according to the selected polynomial fitting order to telemetry data portions in respective slices of the plurality of slices, to produce respective compressed telemetry data portions. The application of the polynomial fitting according to the selected polynomial fitting order to the telemetry data portions in the respective slices can include applying a polynomial fitting according to a first polynomial fitting order to a telemetry data portion in a first slice, and applying a polynomial fitting according to a different second polynomial fitting order to a telemetry data portion in a second slice.

The process 600 includes transmitting (at 610), from the computing system over a network, the compressed telemetry data portions to a processing system for processing of the compressed telemetry data portions.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

select a slice size and a polynomial fitting order from a plurality of candidate slice sizes and a plurality of candidate polynomial fitting orders for representing a series of telemetry data obtained by sensors in a computing environment, wherein the selecting is based on solving an optimization problem comprising variables representing the slice size, the polynomial fitting order, and a measure of fit;

divide the series of telemetry data into a plurality of slices having the selected slice size;

apply compression of telemetry data in a slice of the plurality of slices using polynomial fitting according to the selected polynomial fitting order, the applied compression producing compressed telemetry data; and cause transmission, from the system over a network, the compressed telemetry data to a processing system for processing of the compressed telemetry data.

2. The non-transitory machine-readable storage medium of claim 1, wherein the polynomial fitting is applied to first telemetry data in a first slice of the plurality of slices to produce a first compressed telemetry data portion, and the polynomial fitting is applied to second telemetry data in a second slice of the plurality of slices to produce a second compressed telemetry data portion.

3. The non-transitory machine-readable storage medium of claim 2, wherein the first compressed telemetry data portion comprises a first collection of polynomial coefficients produced by applying the polynomial fitting to the first telemetry data, and the second compressed telemetry data portion comprises a second collection of polynomial coefficients produced by applying the polynomial fitting to the second telemetry data.

4. The non-transitory machine-readable storage medium of claim 3, wherein a first polynomial fitting order selected for the first slice of the plurality of slices is different from a second polynomial fitting order selected for the second slice, and wherein a quantity of polynomial coefficients in the first collection of polynomial coefficients is different from a quantity of polynomial coefficients in the second collection of polynomial coefficients.

5. The non-transitory machine-readable storage medium of claim 4, wherein the instructions upon execution cause the system to:

select the first polynomial fitting order for the first slice by solving the optimization problem for the first slice; and select the second polynomial fitting order for the second slice by solving the optimization problem for the second slice independently from solving the optimization problem for the first slice.

6. The non-transitory machine-readable storage medium of claim 3, wherein the instructions upon execution cause the system to:

reconstruct the first telemetry data at the processing system using the first collection of polynomial coefficients to produce reconstructed first telemetry data, and reconstruct the second telemetry data at the processing system using the second collection of polynomial coefficients to produce reconstructed second telemetry data.

7. The non-transitory machine-readable storage medium of claim 6, wherein the instructions upon execution cause the system to:

perform troubleshooting or management of the computing environment using reconstructed telemetry data comprising the reconstructed first telemetry data and the reconstructed second telemetry data.

8. The non-transitory machine-readable storage medium of claim 1, wherein the compressed telemetry data comprises polynomial coefficients produced by applying the polynomial fitting to the series of telemetry data, and wherein the instructions upon execution cause the system to:

apply bit quantization on the polynomial coefficients to produce quantized polynomial coefficients, wherein the compressed telemetry data comprises the quantized polynomial coefficients.

9. The non-transitory machine-readable storage medium of claim 1, wherein the polynomial fitting applied to telemetry data in the slice comprises a Chebyshev polynomial fitting.

10. The non-transitory machine-readable storage medium of claim 1, wherein the variables of the optimization problem comprise a first variable representing the slice size and the polynomial fitting order, and a second variable representing the measure of fit.

11. The non-transitory machine-readable storage medium of claim 10, wherein the first variable represents an aggregate of the slice size and the polynomial fitting order.

12. The non-transitory machine-readable storage medium of claim 10, wherein the instructions upon execution cause the system to:

represent values of the first variable using a first polynomial; and represent values of the second variable using a second polynomial.

13. The non-transitory machine-readable storage medium of claim 12, wherein the solving of the optimization problem comprises finding an intersection of the first polynomial and the second polynomial.

14. A computing system comprising:

a hardware processor; and a non-transitory storage medium comprising instructions executable on the hardware processor to:

receive a series of telemetry data of a computing environment;

select a slice size and a polynomial fitting order from a plurality of candidate slice sizes and a plurality of candidate polynomial fitting orders for representing the series of telemetry data, wherein the selecting is based on solving an optimization problem comprising variables representing the slice size, the polynomial fitting order, and a measure of fit;

divide the series of telemetry data into a plurality of slices having the selected slice size;

apply polynomial fitting to telemetry data portions in respective slices of the plurality of slices, to produce respective compressed telemetry data portions, wherein the applying of the polynomial fitting comprises applying a polynomial fitting to a slice of the plurality of slices using the selected polynomial fitting order; and cause transmission, from the computing system over a network, the compressed telemetry data portions to a processing system for processing of the compressed telemetry data portions.

15. The computing system of claim 14, wherein a first compressed telemetry data portion of the compressed telemetry data portions comprises a first collection of polynomial coefficients, and a second compressed telemetry data portion of the compressed telemetry data portions comprises a second collection of polynomial coefficients.

16. The computing system of claim 14, wherein the variables of the optimization problem comprise a first variable representing the slice size and the polynomial fitting order, and a second variable representing the measure of fit.

17. The computing system of claim 16, wherein the instructions are executable on the hardware processor to:

represent values of the first variable using a first polynomial; and represent values of the second variable using a second polynomial.

18. The computing system of claim 17, wherein the solving of the optimization problem comprises finding an intersection of the first polynomial and the second polynomial.

19. A method comprising:

receiving, at a computing system, a series of telemetry data obtained by one or more sensors of a computing environment;

selecting, by the computing system, a slice size and a polynomial fitting order from a plurality of candidate slice sizes and a plurality of candidate polynomial fitting orders for representing the series of telemetry data, wherein the selecting is based on solving an optimization problem comprising variables representing the slice size, the polynomial fitting order, and a measure of fit;

dividing, by the computing system, the series of telemetry data into a plurality of slices having the selected slice size;

applying, by the computing system, polynomial fitting according to the selected polynomial fitting order to telemetry data portions in respective slices of the plurality of slices, to produce respective compressed telemetry data portions; and transmitting, from the computing system over a network, the compressed telemetry data portions to a processing system for processing of the compressed telemetry data portions.

20. The method of claim 19, further comprising:

reconstructing, at the processing system, telemetry data from polynomial coefficients included in the compressed telemetry data portions.

* * * * *